Nov. 16, 1965   A. J. CORSON   3,218,554
POWER MEASURING RECTIFIER BRIDGE CIRCUIT INCLUDING
EXPONENTIAL IMPEDANCE MEANS IN THE
BRIDGE DIAGONAL
Filed Jan. 3, 1961   3 Sheets-Sheet 1

*INVENTOR.*
ALMON J. CORSON
BY
*Irving M. Freedman*
HIS ATTORNEY

INVENTOR.
ALMON J. CORSON
BY
Irving M. Freedman
HIS ATTORNEY

*INVENTOR.*
ALMON J. CORSON
*BY* Irving M. Freedman
HIS ATTORNEY 3,218,554
POWER MEASURING RECTIFIER BRIDGE CIRCUIT INCLUDING EXPONENTIAL IMPEDANCE MEANS IN THE BRIDGE DIAGONAL
Almon J. Corson, Marblehead, Mass., assignor to General Electric Company, a corporation of New York
Filed Jan. 3, 1961, Ser. No. 80,077
6 Claims. (Cl. 324—142)

This invention relates to electrical measuring instruments, and more particularly, to an improved power measurement circuit.

Measurements of electrical quantities frequently require the multiplication of two electrical signals for the indication of electrical quantities such as active or reactive power. It is often desirable that the product of the two electrical quantities be in the form of an electrical signal for transmission to instrumentation at a distance, such as involved in telemetering. It is desirable that the means for providing the watt or VAR indication be uncomplex, provide a relatively high output signal, be stable and accurate, capable of being manufactured in mass production quantities, and relatively low in cost. Problems are encountered with conventional electrodynamic mechanisms, thermal converters, and Hall converters because of difficulty in realizing one or more of the above criteria.

Prior art static type circuits for providing watt or VAR indications have not been utilized commercially to any great extent evidently through their failure to meet the above criteria.

It is a primary object of this invention to provide an improved electric instrument circuit suitable for use in wattmeters and VAR meters which satisfies the aforementioned criteria.

It is another object of this invention to provide an improved electric instrument circuit utilizing static components to provide an electric signal proportional to the product of a plurality of electrical quantities.

It is still another object of this invention to provide an improved wattmeter and VAR meter circuit suitable for use with single or multiphase electrical circuits.

Further objects and advantages of the invention will become apparent as the following description proceeds and the features of novelty which characterize the invention will be pointed out with particularity in the claims annexed to and forming a part of this specification.

In accordance with one form of the invention, a wattmeter circuit is provided comprising a bridge circuit having a first and second adjacent arms connected together at a first junction and a third and fourth adjacent arms connected together at a second junction. The voltage signal of the circuit under measurement is introduced into the bridge circuit by introducing first and second equal value signals proportional to said voltage signal into the first and second arms, respectively. The current signal of the circuit under measurement is applied across an impedance which is connected in series with an exponential resistor between the first and second junctions. The exponential resistor is shunted by a second resistor to provide an effective exponent of two. Rectifiers which are provided in each of the first and second arms are polarized so as to be alternately forward biased upon each half cycle of the voltage signal to provide an output direct current signal across a capacitor shunting the third and fourth arms which is proportional to the power of the circuit under measurement.

For a better understanding of this invention, reference may be had to the following description taken in connection with the accompanying drawings in which.

Figure 1:
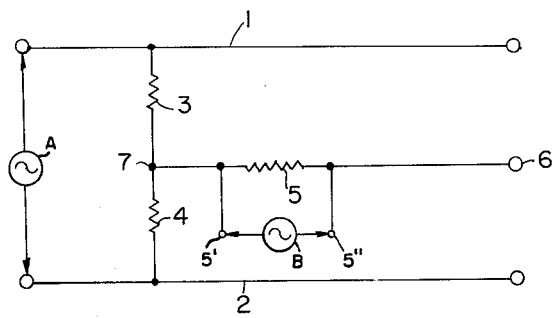
FIGS. 1–3 are simplified schematic drawings useful in explaining the theory of operation of the subject invention.
Figure 2:
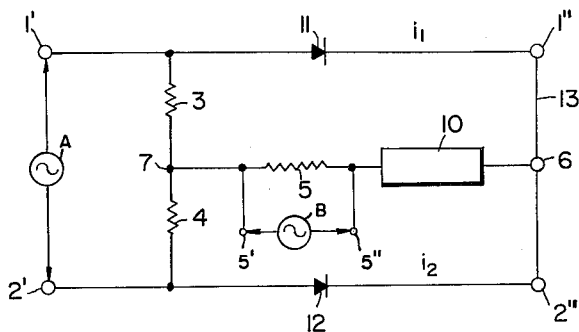
Figure 3:
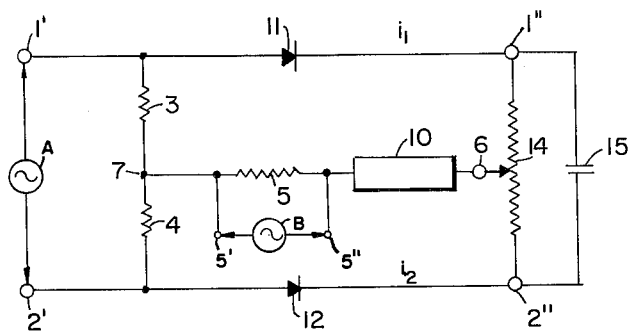

Reference may be had to FIGS. 1–3 for a discussion of the basic and theoretical concepts involved in the subject invention. Referring to FIG. 1, a circuit arrangement is shown for combining two alternating current or A.-C. signals, A and B. The signal A is applied across the lines 1 and 2 and across equal magnitude resistors 3 and 4 connected therebetween. The signal B is applied across resistor 5 connected between output terminal 6 and the junction 7 between resistors 3 and 4. When line 1 is positive related to line 2 at the same time that junction 7 is positive relative to terminal 6 due to signals A and B respectively, the output which appears between line 1 and output terminal 6 is equal to $$\frac{A}{2}+B$$

This signal condition will hereinafter be referred to as the positive half cycle signal A. When signals A and B reverse in polarity, that is, when line 2 becomes positive with respect to line 1, and junction 7 becomes negative relative to terminal 6, the output between line 2 and terminal 6 will be equal to $$\frac{A}{2}-B$$

This signal condition will hereinafter be referred to as the negative half cycle of signal A.

In FIG. 2, the arrangement of FIG. 1 is modified such that the two output signals are applied to an exponential resistance and the current flow is made proportional to the second power of the voltage. Referring to FIG. 2, a nonlinear exponential resistance 10 has been inserted between resistor 5 and terminal 6 while a diode 11, poled as shown, has been inserted in line 1 between input terminal 1' and output terminal 1'' while a diode 12 has been similarly inserted in line 2 between input terminal 2' and output terminal 2''. A common return 13 is connected between output terminals 1'', 2'', and 6. The current $i_1$ flowing in line 1 is equal to $$k\left(\frac{A}{2}+B\right)^2$$

while the current $i_2$ flowing in line 2 is equal to $$k\left(\frac{A}{2}-B\right)^2$$

The current flowing through the nonlinear resistor 10 is equal to $kV^2$.

If the output circuit is then modified as shown in FIG. 3 by adding a variable resistor 14 between output terminals 1'' and 2'' and connecting the tap thereof to output terminal 6, the voltage measured across output terminals 1'' and 2'' is equal to $$\frac{r_{14}}{2}(i_1-i_2)=\frac{r_{14}}{2}K\left[\left(\frac{r_{3,4}}{2}+r_5\right)^2-\left(\frac{r_{3,4}}{2}-r_5\right)^2\right]$$

$$=\frac{r_{14}}{2}k2r_{3,4}r_5=kr_{3,4}r_5$$

If a capacitor 15 is connected across the output terminals 1'' and 2'', the average D.-C. potential may be measured with a conventional D.-C. electric instrument such as a D'Arsonval moving coil permanent magnet type of instrument. The potential measured is equal to $$\frac{1}{T}\int_0^t e i \, dt$$

or active power, where the signal applied across input terminals 1 and 2 is the voltage of the circuit under measurement and signal applied across resistor 5 is the current flowing in the circuit under measurement.

In practice it is usually necessary to derive the signal appearing across resistor 5, signal B, from the secondary of a current transformer in order to combine it at the desired impedance level with the signal A. Also, in practice it is necessary that the exponent of the nonlinear resistor 10 be greater than two to arrive at the desired squaring effect with the linear circuit components present. A practical circuit configuration of the arrangement shown in FIG. 3 and discussed above is shown in FIG. 4.

Figure 4:
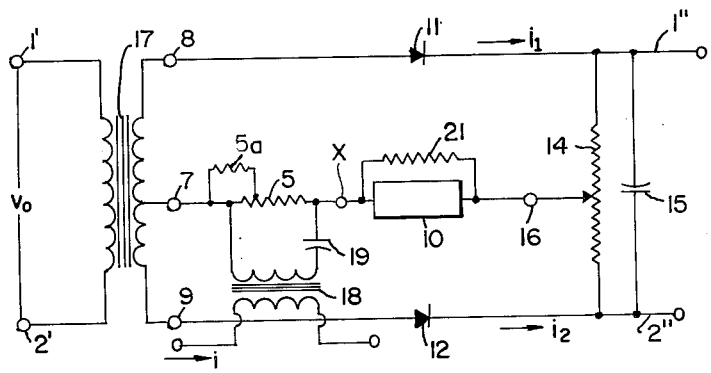
FIG. 4 illustrates a basic embodiment of the invention shown in schematic form.

Referring to FIG. 4, it will be seen that the input voltage applied between terminals 1' and 2' is coupled to the circuit through transformer 17, the primary of which is connected across the terminals 1' and 2' and the center-tapped secondary of which is utilized in place of the resistors 3 and 4. The current flowing in the circuit under measurement is applied to impedance 5 through current transformer 18, the secondary of which in series with blocking capacitor 19 is connected across resistor 5. The blocking capacitor keeps direct currents out of the transformer to avoid biasing the transformer and introducing nonlinearities into the circuit. A linear resistor 21 is connected in shunt with the exponential resistor 10 so that the combined circuit will provide the desired squaring function. The shunt padding resistor 21 is relatively effective in that respect at lower voltage while the series circuit resistance is relatively effective at higher voltages.

In FIG. 4 the junction between the secondary of transformer 17 and diode 11 is indicated as 8 while the junction between the secondary of transformer 17 and diode 12 is indicated as 9. The junction between the exponential resistance 10 and the resistor 5 is indicated as X.

On application of voltage $V_o = V_m \sin wt$ between terminal 1' and 2' and current $i = I_m \sin (wt - \theta)$ through the primary of current transformer 18 the total instantaneous potential on the positive half cycle of signal A, with a 1:1 ratio potential transformer 17 and 10:1 ratio current transformer 18 is (1) $\quad V_{8x} = V_{m/2} \sin wt + \frac{I_m}{10} R_5 \sin (wt - \theta)$ and on the negative half cycle of signal A it is (2) $\quad V_{9x} = V_{m/2} \sin wt - \frac{I_m}{10} R_5 \sin (wt - \theta)$ The current, $i_1$, on the positive half cycle of signal A is (3)

$i_1 = K_1 V_{8x}^2 = K_1 [V_{m/2} \sin wt + I_{m/10} R_5 \sin (wt - \theta)]^2$ similarly the current $i_2$ on the negative half cycle of signal A is (4)

$i_2 = K_1 V_{9x}^2 = K_1 [V_{m/2} \sin wt - I_{m/10} R_5 \sin (wt - \theta)]^2$ The average D.-C. voltage $V_{1''2''}$ at the output end is (5) $\quad Vdc = \frac{1}{T} \int_0^t \frac{R_{14}}{2} (i_1 - i_2) dt$ Substituting Equations 3 and 4 in equation 5, and simplifying (6) $\quad Vdc = \frac{1}{T} \int_0^t \frac{R_{14}}{2} K_1 V_m \sin wt \frac{I_m}{10} \sin (wt - \theta) dt$ Since $\sin (wt - \theta) = \sin wt \cos \theta - \cos wt \sin \theta$ and $t = 2\pi$ for one complete cycle $Vdc = \frac{V_m I_m (K_1 R_{14})}{2\pi \times 10} \int_0^{2\pi} \sin^2 wt \cos \theta \, dt -$ $\int_0^{2\pi} \sin wt \cos wt \sin \theta \, dt$ Integrating and reducing, $Vdc = \left(\frac{K_1 R_{14}}{20\pi}\right) I_m V_m \cos \theta = K' I_m V_m \cos \theta$ The above relationships show that the output voltage represents the real power of the circuit under measurement. From the above relationships it can also be seen that the voltage output across terminals 1'' and 2'' is maximized by making the balancing resistor 21 large relative to the resistance of the entire circuit. In essence, this means that the exponent of the nonlinear resistor 10 should be 3 to 4 to allow for the attenuating effect of the balancing resistor 21, and other lineal circuit components, with an exponent of 2 as the end result.

Nonlinear exponential resistors constructed of silicon carbide have proven successful in 1% accuracy switchboard type of wattmeters. Suitable silicon carbide resistors may be obtained from the magnetic materials section of the General Electric Company, Edmore, Michigan, or from Morganite, Inc., Long Island City, New York.

Figure 5:
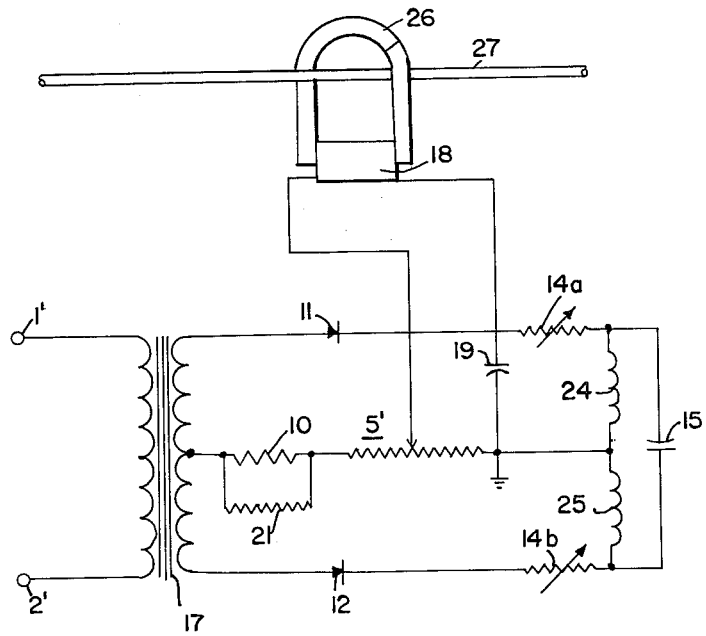
FIG. 5 is a schematic drawing showing a preferred embodiment of the arrangement shown in FIG. 4 for single phase use.

FIG. 5 illustrates the preferred embodiment of a single phase circuit of the type shown in FIG. 4. Referring to FIG. 5, variable resistor 14 has been eliminated and variable resistors 14a and 14b in series with the coils 24 and 25, respectively, of a differential ammeter have been substituted. Such an arrangement provides an output indication having a small response time and good damping characteristics. The current transformer 18, shown schematically as part of the hook-on ammeter 26 encircling conductor 27 under measurement, instead of being connected directly across resistor 5 as in FIG. 4, is connected between a grounded end and the arm or wiper of variable resistor 5'.

Figure 6:
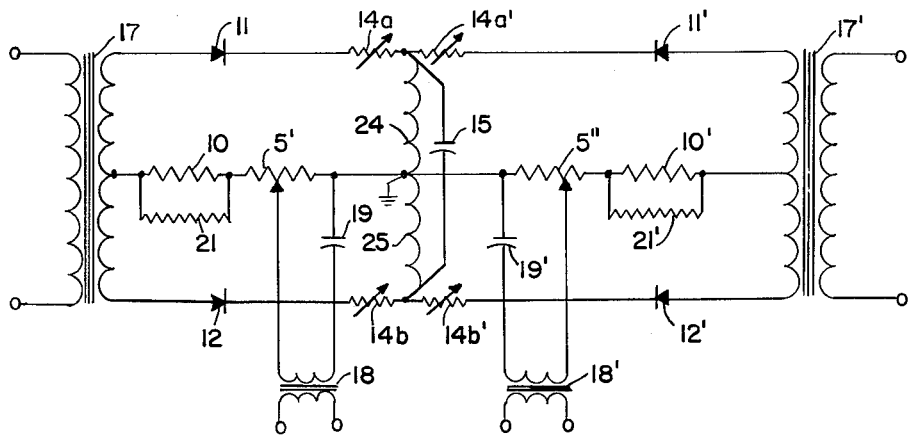
FIG. 6 is a schematic drawing showing an embodiment of the invention suitable for use in a three phase, three wire system.

FIG. 6 illustrates an arrangement suitable for use with a three-phase, three-wire system. Referring to FIG. 6, it will be noted that the ciruitry to the right and left of the differential ammeter coils 24 and 25 shunted by capacitor 15 are essentially mirror images. The junction of coils 24 and 25 of the differential ammeter is grounded. It is to be noted that the circuit is readily adaptable to the measurements of polyphase power and requires only two potential transformers 17 and 17' and two current transformers 18 and 18'.

Figure 7:
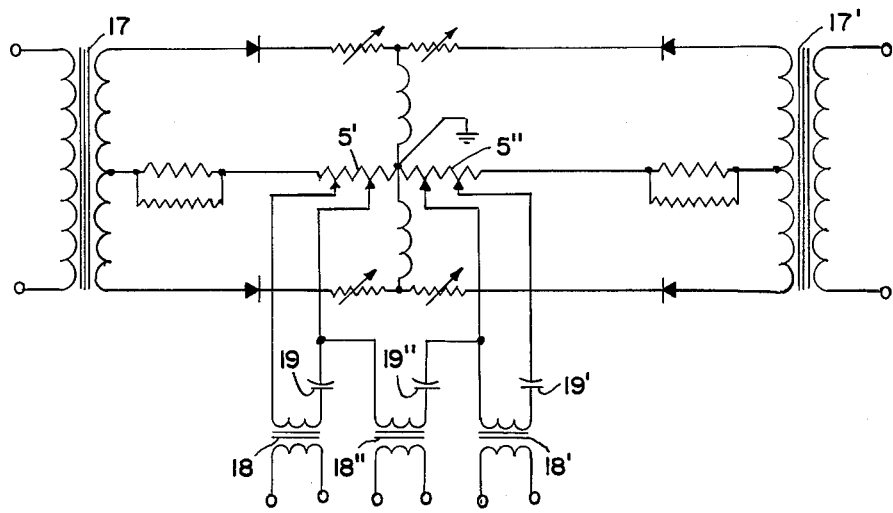
FIG. 7 is a schematic drawing of an embodiment of the invention suitable for use on a three phase, four wire system.

FIG. 7 illustrates an arrangement suitable for use with a three phase, four wire system requiring only two potential transformers 17 and 17' and three current transformers 18, 18' and 18''. The circuit of FIG. 7 is essentially the same as that of FIG. 6 with a few exceptions. Referring to FIG. 7, it will be seen that a current transformer 18'' with its associated blocking capacitor 19'' is connected between the current transformers 18 and 18'. To facilitate adjustment of the circuit the secondary circuits of transformers 18 and 18' are connected to a pair of wipers on variable resistors 5' and 5'', respectively, instead of being connected between one end of the resistor and a single wiper. The circuits described above can be utilized for the measurement and indication of reactive power or VARS by merely providing a 90° phase shift in the input potential signals.

Compensation may be included for the effects of temperature on the circuit and phase angle errors which may be introduced by the transformers 17 and 18. A positive or negative resultant phase angle error will be introduced when the current transformer 18 phase angle is less or greater, respectively, than that of the potential transformer 17. Compensation, if necessary or desirable, may be provided by making impedance 5 slightly inductive or capacitive so that the voltage derived thereby leads or lags the signal from the secondary of transformer 18 the appropriate amount for the desired compensation.

Temperature compensation may be provided, if desired. Exponential resistors of the type described commonly have a negative temperature coefficient of resistance. If the over-all circuit so requires, a portion of the input impedance 5 may be shunted by a negative temperature coefficient compensating resistor 5a as shown in FIG. 4 to reduce the input signal the amount necessary to compensate for increased conductance of the circuit at a high temperature, such as 65° C., chosen for compensation.

Thus, a circuit arrangement has been disclosed which provides an electrical signal which varies as the multiple of a plurality of input signals and which exhibits the characateristics discussed above. The arrangement is suitable for the measurement of either single phase or polyphase watts or VARS.

Therefore, while particular embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. In an electrical measuring instrument of the wattmeter type for multiplying a plurality of A.C. electrical signals, a bridge circuit comprising four serially connected impedance arms including first and second adjacent arms connected together at a first junction, and third and fourth adjacent arms connected together at a second junction, means to introduce into said first and second arms A.-C. signals of equal value, each of said equal value signals being proportional to a first A.-C. electrical signal, an exponential impedance means connected between said first and second junctions and exhibiting an equivalent exponent in said bridge circuit of two, means to introduce a second A.-C. electrical signal in series with said exponential impedance between said first and second junctions, and means to measure the average difference between the currents flowing in said third and fourth arms, said first and second arms further comprising first and second rectifiers, respectively, said rectifiers being polarized with respect to their associated equal value signal so that they are alternately forward biased in response to alternate half cycles of said first signal whereby a direct current output signal proportional to the product of said first and second A.-C. signals is developed in said third and fourth arms.

2. In an electrical measuring instrument of the wattmeter type for multiplying a plurality of A.-C. electrical signals, a bridge circuit comprising four serially connected impedance arms including first and second adjacent arms connected together at a first junction, and third and fourth adjacent arms connected together at a second junction, means to introduce into said first and second arms A.-C. signals of equal value, each of said equal value signals being proportional to a first A.-C. electrical signal, an exponential resistor connected between said first and second junctions, a resistor shunting said exponential resistor, said exponential resistor having an exponent greater than two with the equivalent exponent thereof in said bridge circuit being two, means to introduce a second A.-C. electrical signal in series with said exponential resistor between said first and second junctions, and means to measure the average difference between the currents flowing in said third and fourth arms, said first and second arms further comprising first and second rectifiers, respectively, said rectifiers being polarized with respect to their associated equal value signals so that they are alternately forward biased on alternate half cycles of said first signal whereby a direct current output signal proportional to the product of said first and second A.-C. signals is developed in said third and fourth arms.

3. In an electrical measuring instrument of the wattmeter type for multiplying a plurality of A.-C. electrical signals, a bridge circuit comprising four serially connected impedance arms including first and second adjacent arms connected together at a first junction, and third and fourth adjacent arms connected together at a second junction, means to introduce into said first and second arms A.-C. signals of equal value, each of said equal value signals being proportional to a first A.-C. electrical signal, a first impedance and an exponential resistor connected in series between said first and second junctions, a second resistor shunting said exponential resistor, said exponential resistor having an exponent greater than two with the equivalent exponent thereof in said bridge circuit being two, means to capacitively couple a second A.-C. electrical signal across said first impedance, means to measure the average difference between the currents flowing in said third and fourth arms, said first and second arms further comprising first and second rectifiers, respectively, said rectifiers being polarized with respect to their associated equal value signal so that they are alternately forward biased in response to alternate half cycles of said first signal whereby a direct current output signal proportional to the product of said first and second A.-C. signals is developed in said third and fourth arms.

4. In an electrical measuring instrument of the wattmeter type for multiplying a plurality of A.-C. electrical signals, a bridge circuit comprising four serially connected impedance arms including first and second adjacent arms connected together at a first junction, and third and fourth adjacent arms connected together at a second junction, means to introduce a first A.-C. electrical signal into said first and second arms, said first signal introducing means comprising a transformer having a center-tapped secondary, one of the halves of the secondary being in said first arm and the other being in said second arm, the center tap thereof being connected to said first junction, a first impedance and an exponential resistor connected in series between said first and second junctions, a second resistor shunting said exponential resistor, said exponential resistor having an exponent greater than two with the equivalent exponent thereof in said bridge circuit being two, means to apply a second A.-C. electrical signal through a coupling transformer across said first impedance, a capacitor in series with said first impedance and the secondary of said transformer, means to measure the average difference between the currents flowing in said third and fourth arms, and first and second rectifiers in said first and second arms respectively, said rectifiers being polarized with respect to the associated half of said secondary so as to be alternately forward biased in response to alternate half cycles of said first signal whereby a direct current output signal proportional to the product of said first and second A.-C. signals is developed in said third and fourth arms.

5. In a polyphase electrical measuring instrument of the wattmeter type for multiplying a plurality of A.-C. electrical signals in a three phase, three wire electrical circuit, a first bridge circuit comprising four serially connected impedance arms including first and second adjacent arms connected together at a first junction, and third and fourth adjacent arms connected together at a second junction, means to introduce into said first and second arms A.-C. signals of equal value, each of said equal value signals being proportional to a first A.-C. electrical signal, an exponential impedance means connected between said first and second junctions and exhibiting an equivalent exponent in said bridge circuit of two, means to introduce a second A.-C. electrical signal in series with said exponential impedance between said first and second junctions, and means to measure the average difference between the currents flowing in said third and fourth arms, said first and second arms further comprising first and second rectifiers, said rectifiers being polarized with respect to their associated equal value signal so that they are alternately forward biased in response to alternate half cycles of said first signal, and a second mirror image bridge identical with said first bridge to which a third and fourth A.-C. electrical signal are applied, said third and fourth arms of said second bridge being formed by the corresponding arms of said first bridge, whereby the direct current output signal of each bridge is proportional to the product of the two signals applied thereto and the resultant output flowing in said third and fourth arms is proportional to the sum of the outputs of each bridge.

6. In a polyphase electrical measuring instrument of the wattmeter type for multiplying a plurality of A.-C. electrical signals in a three phase, three wire electrical circuit, a first bridge circuit comprising four serially connected impedance arms including first and second adjacent arms connected together at a first junction, and third and fourth adjacent arms connected together at a second junction, means to introduce into said first and second arms A.-C. signals of equal value, each of said equal value signals being proportional to a first A.-C. electrical signal, an exponential resistor connected between said first and second junctions, said exponential resistor being shunted by a resistor and exhibiting an equivalent exponent in said bridge circuit of two, means to introduce a second A.-C. electrical signal in series with said exponential resistor between said first and second junctions, means to measure the average difference between the currents flowing in said third and fourth arms, said first and second arms further comprising first and second rectifiers, respectively, said rectifiers being polarized with respect to their associated equal value signal so that they are alternately forward biased in response to alternate half cycles of said first signal, and a second mirror image bridge identical with said first bridge to which a third and fourth A.-C. electrical signal are applied, said third and fourth arms of said second bridge being formed by the corresponding arms of said first bridge, whereby the direct current output signal of each bridge is proportional to the product of the two signals applied thereto and the resultant output current flowing in the third and fourth arms common to both bridges is proportional to the sum of the outputs of each bridge.

References Cited by the Examiner
UNITED STATES PATENTS

| | | | |
|---|---|---|---|
| 2,492,556 | 12/1949 | DeGruchy | 324—142 |
| 2,791,747 | 5/1957 | Rosenthal | 324—132 |
| 2,905,818 | 9/1959 | Patton | 324—87 |
| 2,998,569 | 8/1961 | Legatti | 324—142 |

FOREIGN PATENTS

| | | |
|---|---|---|
| 1,037,005 | 8/1958 | Germany. |
| 631,990 | 11/1949 | Great Britain. |

FREDERICK M. STRADER, *Primary Examiner.*

RUDOLPH V. ROLINEC, WALTER L. CARLSON,
*Examiners.*